United States Patent Office
3,111,385
Patented Nov. 19, 1963

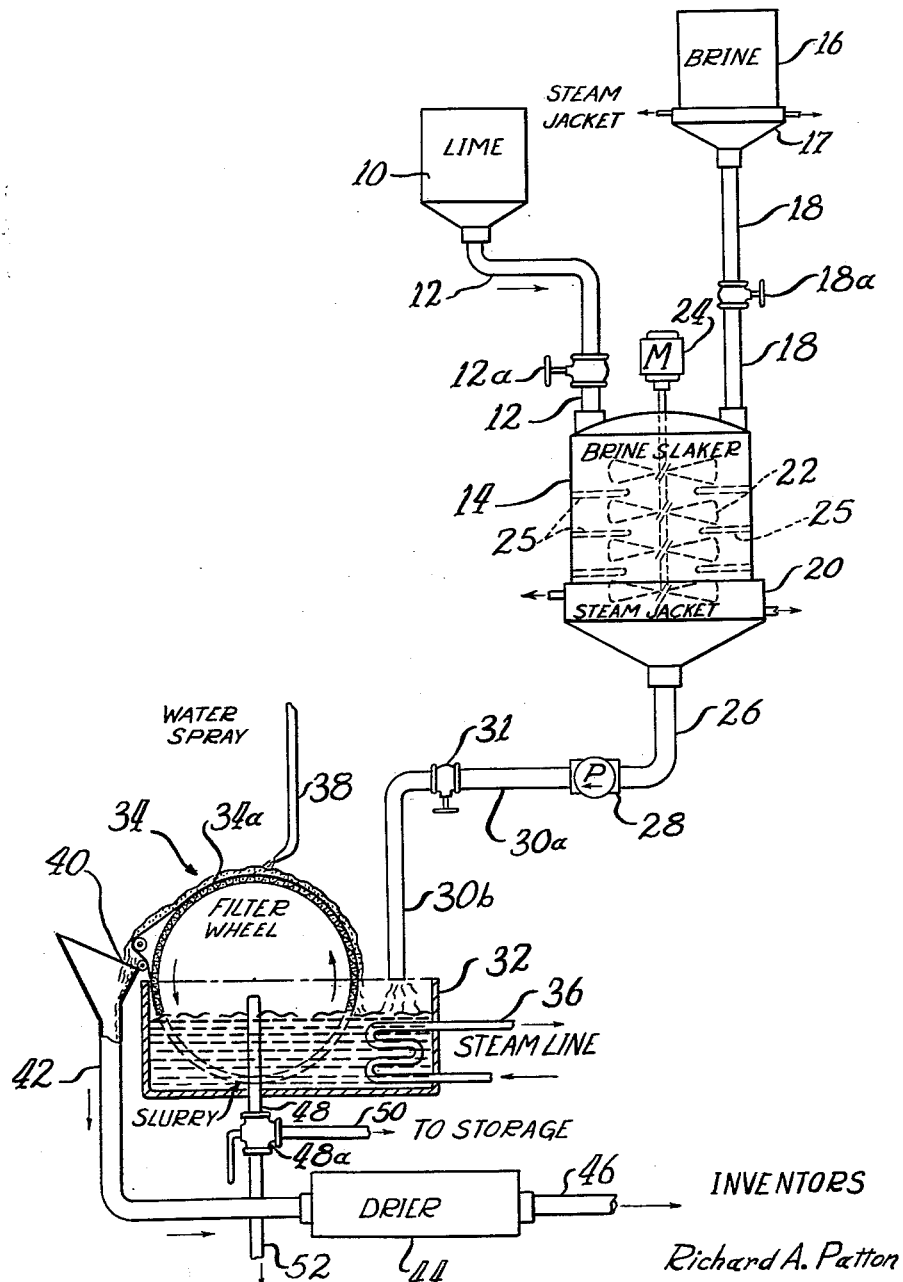

3,111,385
PROCESS FOR PRODUCING MAGNESIUM
HYDROXIDE
Richard A. Patton, Arlington Heights, Charles Baugh, Crystal Lake, and Jack F. Suriano, Chicago, Ill., assignors, by mesne assignments, to Morton Salt Company, Chicago, Ill., a corporation of Delaware (new corporation)
Filed May 4, 1961, Ser. No. 107,830
8 Claims. (Cl. 23—201)

This invention relates to improvements in the production of magnesium hydroxide and more particularly to improvements in the process for producing magnesium hydroxide from dolomitic quicklime.

It is well known that magnesium hydroxide may be readily produced by calcining and slaking natural magnesium containing minerals, such as magnesite (magnesium carbonate).

Dolomite or dolomitic limestone, also used in the production of magnesium hydroxide, is composed essentially of magnesium and calcium carbonates. In order to produce a relatively pure magnesium hydroxide, it is necessary to treat the dolomite to remove the calcium component, inasmuch as this represents a deleterious material in many of the commercial uses to which the product is applied. Conventional procedures involve the calcination of dolomite to produce a dolomitic quicklime, water slaking of the lime to produce the calcium and magnesium hydroxide, treating the slaked lime with a magnesium chloride brine to solubilize the calcium hydroxide component and recovering the magnesium hydroxide by washing, settling and filtration.

It has also been known to produce magnesium hydroxide by direct slaking of dolomitic quicklime with a magnesium chloride brine, thereby concomitantly slaking the calcium and magnesium oxide components and replacing the calcium with magnesium. This latter procedure usually involves the contacting of dolomitic quicklime with a magnesium chloride brine and thereafter passing the admixture into a series of settling tanks whereby the brine component is removed by decantation and washing over a prolonged period. This procedure had obvious drawbacks in that it required the construction of large settling tanks due to the necessarily large in-process inventory of material and furthermore required periods of time, extending up to three weeks or more, before the magnesium hydroxide was recovered.

One additional aspect of this prior art process was that the prolonged contact time resulted in gelatinization of the product which created difficulties in the final washing and filtering steps, and resulted in relatively low filter rates. While the selection of a dolomitic lime of rather large particle size reduced to some extent this gelatinization, this expedient resulted in the loss of the fine lime particles. Furthermore, since the brine reactant and by-products are removed from the slaked lime by diffusion, a considerably more extended period for washing is required. Generally the filtering rate of the product produced by these prior art procedures was from about 0.5 to about 1.2 pounds of solids per hour per square foot of filter surface.

From the foregoing it may be appreciated that the prior art processes for the production of magnesium hydroxide involving the brine slaking of dolomitic quicklime were both cumbersome, time consuming and expensive.

Accordingly it is an object of this invention to provide an improved process for preparing purified high grade magnesium hydroxide.

Another object is the provision of an improved process for producing a magnesium hydroxide by the brine slaking of dolomitic quicklime in a continuous manner.

A still further object is the provision of an improved process for producing magnesium hydroxide from dolomitic quicklime that has a reduced equipment cost and results in a product of improved handlability and filtering characteristics.

A still further object is the provision of an improved process for producing magnesium hydroxide utilizing a broad range of relatively fine particle size dolomitic quicklime.

These and other objects of the present invention will be seen from the following specification and appended claims.

In one broad form the present invention is a continuous process for producing magnesium hydroxide which comprises contacting and admixing dolomitic quicklime with a magnesium chloride brine to form a slurry, maintaining said slurry at a temperature between about 37° C. and the boiling point thereof, and thereafter concomitantly filtering and washing said slurry to recover the magnesium hydroxide product, said filtering step being carried out within a period of from about 10 minutes to 360 minutes from the initial contact of quicklime and brine.

The admixing and contacting of quicklime and magnesium chloride brine is preferably carried out under high shear mixing conditions, such as may be illustrated by reactors or mixers operating at an agitator tip speed of from 600 to about 4000 feet per minute. Dolomitic quicklime used as a starting material in this process is conventionally derived from a dolomitic limestone by calcination. The crushed calcined dolomitic quicklime preferably has a fine particle size at least finer than 70 mesh (U.S. Standard Screen Scale) and preferably from about 100 mesh down to about 200 mesh although a particle size of as fine as 320 mesh may also be utilized. The quicklime should not contain more than about 2.0 percent of $CO_2$, $SO_4$=, silica, $Fe_2O_3$ and $Al_2O_3$ expressed as calcium oxide equivalent. The total CaO and MgO content should not be less than 97 percent.

As indicated, the time of slaking and contact of dolomitic quicklime with magnesium chloride brine is broadly from about 10 to about 360 minutes and preferably from about 15 to about 90 minutes. The filtering step is preferably carried out within the time limits described above from the initiation of the brine-lime admixing and slaking steps.

The brine slaking and treatment of the dolomitic lime is carried out with a magnesium chloride brine. It is herein contemplated that the term magnesium chloride brine (also known as a chemical brine) shall include brines containing other salts in addition to magnesium chloride, such as calcium chloride and/or sodium chloride. The aqueous magnesium chloride brine utilized in the process of this invention conventionally contains from about 7.5 to about 8.5 percent magnesium chloride on a dry weight basis in addition to the other above mentioned ingredients. The magnesium chloride brine treatment may be carried out at temperatures of from 37° C. to the boiling point, preferably at temperatures of from 50 to 100° C., and in the most preferred aspects between about 80 and 95° C.

The process of the present invention involves the simultaneous carrying out of two separate and distinct steps, one of which is that the calcium oxide and magnesium oxide components of the dolomitic quicklime are slaked by the aqueous component of the magnesium chloride brine. The other step involves the reaction of slaked calcium oxide, or more specifically calcium hydroxide, with magnesium chloride in a double decomposition reaction to produce magnesium hydroxide and calcium chloride as by-product. The amount of magnesium chloride brine utilized should be sufficient to fulfill the stoichiometric requirements both for slaking and to convert the calcium hydroxide to magnesium hydroxide in accordance with the above described reaction, and as set forth in the following equation:

$$Ca(OH)_2 + MgCl_2 \rightarrow Mg(OH)_2 + CaCl_2$$

In the most preferred aspects the brine utilized should contain magnesium chloride in an amount essentially equal to the stoichiometric amount, as indicated in the equation above. Of course, larger amounts of brine containing magnesium chloride in excess of the stoichiometric amount may also be utilized, such as for example brines containing up to about an 8 percent excess of magnesium chloride, although as indicated the most preferred aspects of the invention reside in the use of magnesium chloride brines containing magnesium chloride in an amount of from the stoichiometric amount to about a 3 percent excess.

Under the most preferred conditions of the process it is possible to obtain a calcium chloride brine by-product with a maximum of about ½ percent magnesium chloride on a $CaCl_2 \cdot 2H_2O$ solids basis to comply with A.S.T.M. specification D98-56.

It should also be understood that a further aspect of the present invention is the concomitant production and recovery of calcium chloride brine.

Generally the admixing of the magnesium chloride brine and dolomitic lime is preferably carried out under such conditions that the slurry in the reactor, which is subsequently fed to the filter, has a solids content of from about 6 to about 12 percent. The magnesium hydroxide slurry is filtered to remove and recover the calcium chloride brine by-product and recover the magnesium hydroxide product. The product is preferably washed in the filter at the same time. The filtering-washing step may be carried out concomitantly by the use of the conventional filter apparatus, such as a filter wheel. In this procedure the slurry from the filter wheel is accumulated on the filter wheel screen and the excess brine is removed. The filter cake is then washed by spraying with water or the like while on the filter wheel screen. Conventionally from about 0.6 to about 1.2 gallons of water per pound of magnesium hydroxide are used in this washing step. After the debrining and washing step is complete, the resulting filter cake as recovered from the filter wheel has a solids content of from about 46 to about 54 percent.

The product may then be dried in an oven and pulverized for packaging or otherwise handled for further treatment, such as calcining, to produce magnesium oxide of various grades. The calcium chloride brine by-product recovered from the reaction mixture at the filter wheel may be passed to a crystallizer and concentrated to recover the solid calcium chloride product.

For a more complete understanding of the process of this invention, reference should be had to the drawing which comprises a flow sheet or schematic diagram illustrating in one form the apparatus utilized in carrying out the process of the present invention. In that drawing dolomitic quicklime from storage bin 10 is fed continuously via line 12 to slaker 14. Magnesium chloride brine from reservoir 16 is added through line 18 to form a reaction mixture or slurry of dolomitic quicklime in magnesium chloride brine in the slaker 14. The brine from reservoir 16 is pre-heated by means of steam jacket 17, and the slaking slurry or reaction mixture is maintained at a predetermined temperature during the slaking-admixing operation by means of a steam jacket 20. The slaker 14 is equipped with an agitator 22 driven by a motor or power source 24, and with suitable baffling 25. The reacted slurry of slaked quicklime is passed continuously from slaker 14 via conduit 26 intermediate pump 28 and lines 30a and 30b to filter wheel tub 32.

The feed of dolomitic quicklime and brine to slaker 14 through lines 12 and 18 is controlled by means of intermediate valves 12a and 18a, respectively. These valves, or similar flow control means, may be operated so as to coordinate with pump 28 and valve 31 to regulate and balance the rate of feed and withdrawal of materials to slaker 14. Automatic means (not shown) may be used to couple and control the valves, if desired.

The slurry of slaked dolomitic quicklime is accumulated in the filter wheel tub 32 of the filter wheel apparatus 34. The filter wheel tub is preferably equipped with a heating element 36 (steam line) to control and maintain the temperature of the contents in the tub. The filter wheel tub 32 (shown in section) is provided with heating elements or steam line to maintain the magnesium hydroxide slurry and brine at a predetermined temperature. The magnesium hydroxide solids in the slurry in tub 32 are collected on the screen 34a of the filter wheel 34. The solids on the filter wheel screen 34a are washed with a water spray 38 and the washed and drained filter cake is removed from the filter screen by collector 40 passed through conduit 42 to a drier 44. The dried magnesium hydroxide recovered from the effluent end 46 of the drier 44 may be packaged as such or may be further treated, such as by calcining, to produce magnesium oxide.

The brine component of the slurry entering the filter wheel tub 32 is chiefly a calcium chloride brine. This calcium chloride brine is recovered from the filter wheel operation and passed via line 48 to two-way valve 48a to storage (line 50) or to further treatment and processing (line 52), such as by concentration, purification and the like.

If desired, the reacted slurry of magnesium hydroxide and brine from reactor 14 may be passed through a hydraulic classifier to produce a more highly purified product. By the use of this apparatus, heavy solid impurities may be removed from the slurry stream.

In one specific example, the process of the present invention is carried out in the described apparatus on dolomitic quicklime having an average particle size of about 100 mesh (90% is minus 100 mesh and 10% is 80 to 100 mesh, U.S. Standard Screen Scale) a total impurity analysis $R_2O_3$, $SiO_2$, $Fe_2O_3$, $CO_2$ and $SO_3{=}$ of 0.886 percent, expressed as calcium oxide, and a calcium oxide content of 57 percent is fed into slaker 14 and admixed with a magnesium chloride brine at a temperature of about 80° C. The initial solids content of the lime-brine slurry was about 9 percent. The amount of magnesium chloride brine used contained magnesium chloride in a 1.3 percent stoichiometric excess of that required to convert calcium hydroxide produced in the slaking operation to magnesium hydroxide. The aqueous magnesium chloride brine utilized in this example had the following composition on a weight basis:

| | Percent |
|---|---|
| Magnesium chloride | 7.8 |
| Calcium chloride | 14.2 |
| Alkali metal chloride (NaCl 3.6%, KCl 0.7%) | 4.2 |

The brine treatment was carried out in an apparatus of the type described in the Patton and Baugh application Serial No. 654,925, filed April 24, 1957, now abandoned, for a period of 15 minutes at 80° C., with the agitator operating at a tip-speed of about 2100 feet per minute. From the brine reactor 14, the slurry was passed to the filter wheel tub 32 at a solids content of about 10.4 percent. The slurry in the filter wheel tub was maintained at a temperature of about 80° C. The magnesium hydroxide solids from the slurry in the filter wheel tub were accumulated on the filter surface of the filter wheel (equipped with a Dacron cover) at a rate of 8.5 pounds per square foot per hour (dry solids basis).

The filter cake on the filter wheel screen was washed with water at a rate of 0.8 gallon per pound of magnesium hydroxide (dry basis). The overall operating time from the initial contacting of dolomitic quicklime and brine to the filtering-washing step was about 45 minutes.

The filter cake recovered from the filter wheel had a solids content of about 50 percent. The filter cake was passed through a drying chamber and further dried to a solids content of about 100 percent.

The calcium chloride brine recovered from the process illustrated by the foregoing example was concentrated by evaporation to produce a calcium chloride product having a magnesium chloride content of about 0.3 percent based upon calcium chloride dihydrate solids.

From the foregoing description it may be seen that the product of the present invention is adapted to the production of magnesium hydroxide by rapid and efficient means. The processes of the prior art involving the use of large settling tanks have an overall operation time wherein the brine was in contact with the dolomitic quicklime reactant and slaking product for periods of from several days to as long as three weeks. In the process of this invention the magnesium hydroxide solids and/or dolomitic quicklime starting material are in contact with the magnesium chloride brine for time periods of from 10 to about 360 minutes which effects a substantial reduction of "in-process" inventory of materials and eliminates the necessity for unduly large storage vessels as well as providing a product of superior handling, washing and filtering characteristics.

Accordingly, the method of this invention produces a magnesium hydroxide slurry which may be filtered relatively easily, permitting a high through-put of magnesium hydroxide product per unit of available filter surface area in a given plant. Specifically, the filtering rate may vary from about 2.5 to about 18 pounds per hour per square foot of filter surface and under the most preferred conditions from about 6 to 12 pounds per square foot per hour.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A continuous process for producing calcium chloride brine and magnesium hydroxide which comprises contacting and admixing dolomitic quicklime and a magnesium chloride chemical brine wherein the magnesium chloride is utilized in an amount of from the stoichiometric amount to a 3% excess of the stoichiometric amount required to react with and convert the calcium hydroxide present in the dolomitic quicklime to magnesium hydroxide, under high shear mixing conditions at a temperature between about 37° C. and the boiling point of the admixture, and thereafter filtering said admixture to separate the resulting calcium chloride brine from said admixture, and washing the residual magnesium hydroxide product during said filtering step and after separation of the brine, said filtering and washing steps being carried out within a period of from about 10 to about 360 minutes from the initial contact of the quicklime and brine and wherein said calcium chloride brine contains magnesium chloride in an amount of up to about 0.5% on a calcium chloride dihydrate solids basis.

2. The process of claim 1 wherein the dolomitic quicklime has an average particle size of less than 70 mesh (U.S. Standard Screen Scale).

3. The process of claim 1 wherein the contacting is carried out at a temperature of from 50° to 100° C.

4. The process of claim 1 wherein the contacting is carried out at a temperature of from 80° to 95° C.

5. The process of claim 1 wherein the time period from the initial contacting with brine to the initiation of the filtering step is from fifteen to ninety minutes.

6. A continuous process for producing calcium chloride brine and magnesium hydroxide which comprises contacting and admixing a dolomitic quicklime having an average particle size of less than about 70 mesh (U.S. Standard Screen Scale) with a magnesium chloride chemical brine wherein the magnesium chloride is utilized in an amount of from the stoichiometric amount to a 3% excess of the stoichiometric amount required to react with and convert the calcium hydroxide present in the dolomitic quicklime to magnesium hydroxide, said contacting and admixing being carried out under high shear mixing conditions, and at a temperature between about 50 and 100° C., and thereafter filtering said admixture to separate the resulting calcium chloride brine and washing the residual magnesium hydroxide product during said filtering step and after separation of the brine, said filtering and washing steps being carried out within a period of from about 15 to about 90 minutes from the initial contact of the quicklime and brine and wherein said calcium chloride brine contains magnesium chloride in an amount of up to about 0.5% on a calcium chloride dihydrate solids basis.

7. The process of claim 6 wherein the admixing is carried out at a temperature of from about 80 to about 95° C.

8. The process of claim 6 wherein the dolomitic quicklime has an average particle size of from about 100 to about 200 mesh (U.S. Standard Screen Scale).

References Cited in the file of this patent

UNITED STATES PATENTS

| | | |
|---|---|---|
| 2,041,047 | Chesny et al. | May 19, 1936 |
| 2,224,780 | Chesny | Dec. 10, 1940 |
| 2,255,422 | Heath et al. | Sept. 9, 1941 |
| 2,405,055 | Robinson et al. | July 30, 1946 |
| 2,493,752 | Maestri | Jan. 10, 1950 |